United States Patent [19]

Brems

[11] 4,362,233

[45] Dec. 7, 1982

[54] PALLET REGISTRY MECHANISM

[76] Inventor: John H. Brems, 32867 White Oaks Trail, Birmingham, Mich. 48010

[21] Appl. No.: 164,092

[22] Filed: Jun. 30, 1980

Related U.S. Application Data

[63] Continuation-in-part of Ser. No. 950,318, Oct. 11, 1978, abandoned.

[51] Int. Cl.³ .............................................. B65G 47/00
[52] U.S. Cl. .................................... 198/345; 198/472
[58] Field of Search ................. 198/345, 472; 29/1 R, 29/1 A, 563, 33 P, 1.5; 74/104, 107

[56] References Cited

U.S. PATENT DOCUMENTS

| | | | |
|---|---|---|---|
| 2,672,675 | 3/1954 | Cross | 198/345 |
| 2,673,386 | 3/1954 | Cross | 198/345 |
| 3,143,131 | 8/1964 | Spencer | 74/104 |
| 3,155,217 | 11/1964 | Cross | 198/345 |
| 3,571,872 | 3/1971 | Van Den Kieboom | 198/345 |
| 3,887,351 | 6/1975 | Dahlman et al. | 198/345 |
| 3,888,341 | 6/1975 | Konkal et al. | 198/345 |
| 3,968,869 | 7/1976 | Stalker | 198/345 |
| 4,148,400 | 4/1979 | Cross | 198/345 |
| 4,201,284 | 5/1980 | Brems | 198/345 |

*Primary Examiner*—Joseph E. Valenza
*Attorney, Agent, or Firm*—Barnes, Kisselle, Raisch & Choate

[57] ABSTRACT

A multiple station transfer machine using work-carrying pallets which move along transfer rails from station to station and are located, i.e., brought into registry, at each station and clamped in place for a work operation including a mechanism for operating pallet locating means and clamping means which eliminates cams and wedges and utilizes high efficiency levers operating independently of any change in dimension due to wear. A single energy storage means at each station operates both the locator lever and the clamping lever sequentially through an interconnecting mechanism. A common release mechanism underlies the stations and is operable to act against the energy storage means to effect release of the registry means and the clamping means while pallets are moving between stations.

28 Claims, 10 Drawing Figures

PALLET REGISTRY MECHANISM

This is a continuation-in-part of my copending application on a Pellet Registry Mechanism, Ser. No. 950,318, filed Oct. 11, 1978, now abandoned.

REFERENCE TO COPENDING APPLICATIONS

Reference is made to my copending applications, Ser. No. 957,300, filed Nov. 2, 1978, on Pellet Registry System, now U.S. Pat. No. 4,201,284 and Ser. No. 918,528, filed June 23, 1978, on a Work Clamp and Pallet Combination, now U.S. Pat. No. 4,223,880.

1. Field of Invention

Multiple station transfer machines for use in automation equipment using multiple work-carrying pallets which are moved to various stations, located accurately by a registry device and clamped in place for the initiation and completion of a particular machining operation.

2. Background and Objects of the Invention

In some types of automatic workpiece processing, workpieces are located and clamped in pallets, which are progressively transferred from station to station of a multiple station transfer machine on slide rails or the like. In each station, these pallets are accurately located and clamped by a mechanism referred to as a pallet registry.

Pallet registries of a variety of types have been in use in industry for many decades. Several such registry mechanisms are shown in U.S. Pat. Nos. 2,672,675; 2,673,386; 3,155,217; 3,571,872; and 3,968,869. As a broad generalization, these and others can be categorized into two types: a first type, in which each registry is operated by one or more hydraulic cylinders, and a second type in which multiple registries are ganged together and operated by a single power source such as a cylinder or suitable mechanical device.

Registries of the first type, which are self-powered, employ locating pins and clamps which may be mechanically interlocked or operated by separate cylinders and are characterized by having relatively large movement capability of the clamping members for the pallet.

Registries of the second type, in which a group of registries is actuated by a single power means, are characterized by having the locating pins directly actuated by the common power means, while the clamp members are actuated by, or through, elastic members such as relatively low work output springs and the clamp member movement ranges are therefore relatively small. Accordingly, the amount of wear which can be tolerated on the clamp members and/or the associated clamp surface on the pallets is very small. Stated another way, a small amount of wear on either the clamps members or the associated clamp surface of the pallet will create a large change in the clamping force or even no clamping force at all. When the clamp surface of the pallet consists of one side of a horizontal plate member, known as a pallet foot, and the opposite side of the foot is the sliding surface on which the pallet slides from station to station, as is generally the case, then wear on this pallet foot slide surface and/or wear of the associated fixed rail further magnifies the problem of variable clamp force, or zero clamp force, due to wear. The aggregate wear on the slide rails, pallet foot, pallet clamp surface, and the clamp member greatly affects the clamp force because of the small amount of available clamp member movement. When the aggregate wear exceeds this clamp member movement, the clamp force drops to zero.

It is one object of this invention to provide a pallet registry design in which a group of registries may be ganged together and operated by a single power means while providing a clamp member movement of significantly greater range than those of present designs.

In present registry designs of the second type, in which multiple registries are operated by a single power means, the locating pins in each registry are directly actuated by that power means. Therefore, a slight mislocation of a pallet in any given registry will cause the entire power means to stall or break a component in the offending registry, since all the force generated by the common power means is concentrated on the offending registry.

It is, therefore, another object of this invention to provide a pallet registry in which multiple registries are operated by a common power source, but the locating pins, as well as the clamp members, are independently actuated by individual internal elastic members when the common power source is operated.

In present registry designs, the clamp members are generally actuated by wedges, either straight line or circular, or screws, which are low efficiency mechanisms. Low efficiency refers to the fact that the work (force times distance) output from the mechanism is much less than the work into the mechanism, the loss being due to friction. Not only does the friction detract significantly from the theoretical force output of a wedge or screw mechanism, but variations in friction cause larger changes in the force output than such variations make in higher efficiency mechanisms.

It is a further object of this invention to provide a pallet registry in which the clamping force is transmitted from a power source to the clamp members through high efficiency mechanisms, such as simple levers, pivots, and rolling contacts.

In present registry designs, the reactive loads, due to the clamping forces, on the locating and structural components of the registry appear as significant bending loads thereon.

It is another object of this invention to provide a registry in which the bending loads due to clamping are primarily confined to members whose deflection does not affect the accuracy of pallet location, and in which the bending loads imposed on the locating and structural components of the registry are minimized to achieve lower deflections per unit of clamping force.

In many present registry designs, the transfer system operates above and through the pallet registry. Therefore, from a maintenance standpoint, in order to remove or replace a registry, it is necessary first to remove the transfer system, or parts of it, which increases the work and time required for maintenance.

It is another object of this invention to provide a pallet registry which, by virtue of its inherent characteristics, can be made in two independent subassemblies which are mounted to the machine bed on each side of a substantially central transfer system, and one side or the other or both sides of the registry can be removed or replaced on the machine bed without removing the transfer system.

Other objects of the invention will be apparent in the following description and claims in which, with the accompanying drawings, there is disclosed the principles of operation of the invention, together with details to enable a person skilled in the art to practice the invention all in connection with the best mode presently contemplated for the practice thereof.

Drawings accompany the disclosure, and the various views thereof may be briefly described as follows.

As background for the terms "high efficiency" mechanisms and "low efficiency" mechanisms, which are used throughout this disclosure, the efficiency of a mechanism will be defined as the ratio of the work out to the work in, where work is used in the normal sense of force times distance. The efficiency of a mechanism is therefore $$\text{Efficiency} = \frac{\text{Output Force} \times \text{Output Distance}}{\text{Input Force} \times \text{Input Distance}}$$

High efficiency mechanism are those having an efficiency of 85% or higher, while low efficiency mechanisms have an efficiency of less than 85%. Of the basic or fundamental types of mechanisms, those with high-efficiency are pivots, levers, gears and rolling contact mechanisms, while wedges and screws are considered as low efficiency mechanisms. The loss of efficiency of any mechanism is attributable to friction, ignoring such relatively minor factors as lubricant churning or windage. Therefore, in high efficiency mechanisms, losses due to friction are quite small, 15% or less; while in the low efficiency mechanisms of a wedge or screw, the friction losses are 15% or more—generally much more. Furthermore, with the low efficiency mechanisms, not only is much of the output work reduced by the frictional losses, but the inevitable inconsistent nature of the frictional variations causes a high degree of inconsistency of the output work. Since the relationship of output distance to input distance is fixed by the fixed mechanical interrelationship of a given mechanism, and the distance portion of the ratio is therefore fixed, loss of efficiency is reflected as a loss of output force, and, in the case of low efficiency mechanisms, as an inconsistency of output force as well as a loss thereof.

Figure 1:
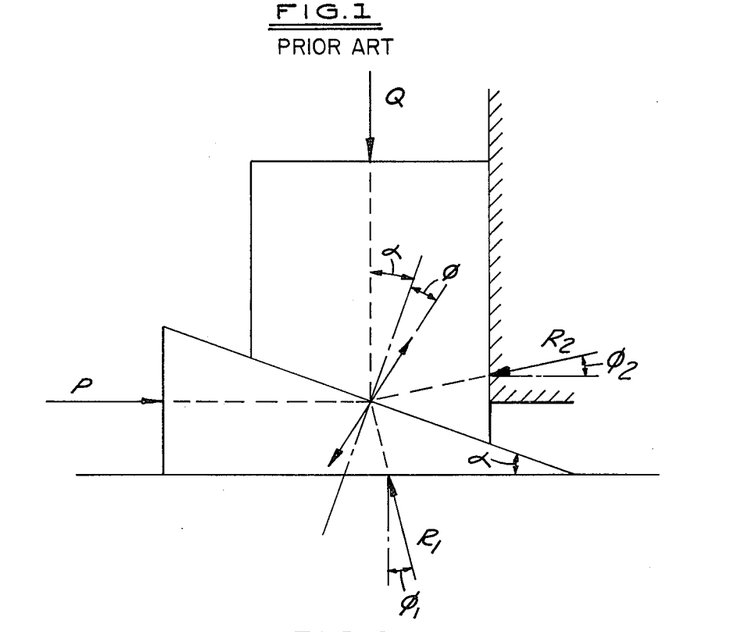
FIG. 1, a schematic force diagram showing the forces on a simple wedge acting with friction.

This is quantitatively illustrated by the drawing of a simple wedge, shown in FIG. 1, operating with friction. From an excellent derivation of such a wedge with friction on pages 126 and 127 of Brandt's "Vectorial Mechanics" (John Wiley & Sons, Copyright 1930), the ratio of the input force P to the output force Q is shown to be $$\frac{P}{Q} = \frac{\sin(\alpha + \phi + \phi_1)\cos\phi_2}{\cos(\alpha + \phi + \phi_2)\cos\phi_1} \quad (1)$$

where:
$\alpha$ = wedge angle,
$\phi$ = friction angle at wedge interface,
$\phi_1$ = friction angle of driving wedge,
$\phi_2$ = friction angle of driven wedge, and the friction angles are the arc tangents of the respective coefficients of friction.

By making the reasonable assumption that the three friction angles are identical, i.e., $\phi_2 = \phi_1 = \phi$, and by inverting equation (1) to give the ratio of output force to input force:

$$\frac{Q_F}{P} = \frac{\cos(\alpha + 2\phi)}{\sin(\alpha + 2\phi)} = \frac{1}{\tan(\alpha + 2\phi)} \quad (2)$$

The output force Q is noted as $Q_F$ to define it as the output force when friction is present in the system.

This same equation can be used to determine the output force, $Q_o$, when the friction is assumed to be zero in which case the angle $\phi$ is zero. Therefore, the ratio of the output force $Q_o$ to the input force P under conditions of zero friction is:

$$\frac{Q_o}{P} = \frac{1}{\tan\alpha} \quad (3)$$

The efficiency of a wedge with friction is the ratio of the output force with friction to the output force without friction or $$\frac{Q_F}{Q_o}.$$

This can be found by dividing equation (2) by equation (3) which gives:

$$\text{Efficiency} = \frac{Q_F}{Q_o} = \frac{\tan\alpha}{\tan(\alpha + \phi)} \quad (4)$$

Figure 2:
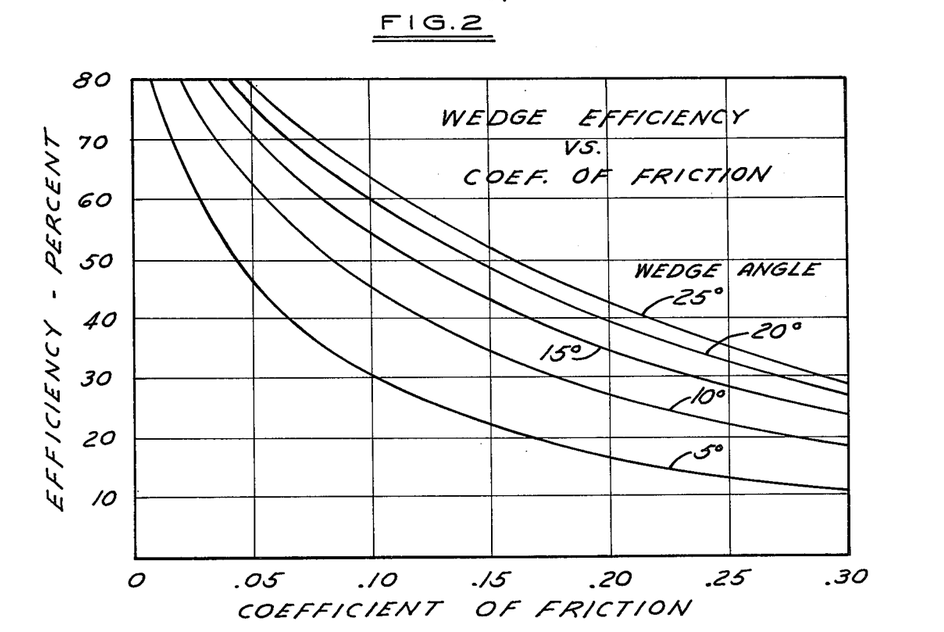
FIG. 2, a graph showing the efficiency of wedges acting with friction.

The efficiency of a wedge versus the coefficient of friction for a sampling of representative wedge angles is shown in FIG. 2. It is clear that these efficiencies are very low in general, and, for a representative situation using a 15° wedge and a coefficient friction of 0.15, the wedge efficiency is only 43%. Furthermore, it can be seen that variations in the coefficient of friction due to variations in lubrication, surface wear, etc. cause large changes in an already low efficiency.

Screws may be considered as circular wedges having a low wedge or helix angle. Indeed this makes them self locking. Screws generally have efficiencies which approximate or are lower than the 5° wedge angle curve of FIG. 2.

The primary objective of this brief analysis of wedges and screws is to quantitatively demonstrate the relatively low efficiency of such mechanisms. With large amounts of input force available, this deficiency is of little disadvantage, but when a group of mechanisms is to be operated by a single power source, the mechanism efficiency is of some importance.

For this and other reasons, the invention described below uses no screws or wedges to generate the clamping force. The primary other reason for using only high efficiency mechanisms, such as levers and pivots, is that variations in friction are much less effective in varying the clamp force, and, therefore, much more consistent clamp forces are obtained.

In the embodiments to be described, using a two-lever system, the interconnected high efficiency mechanisms (levers) in terms of total work output, force times distance moved of the clamp means is 70% or more of the work input force times distance. This is clearly in the high efficiency range.

Figure 3:
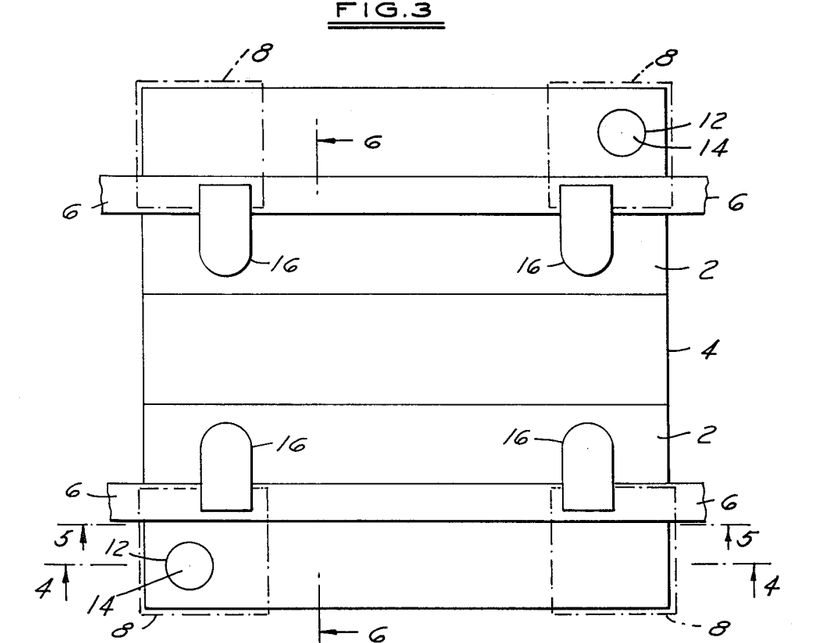
FIG. 3, a plan view of the registry mechanism of the present invention.

A plan view of the registry mechanism is shown in FIG. 3. This is comprised of two identical housings 2 mounted on a machine bed 4. The space between the housings 2 is available for passage of the transfer bar which indexes the pallets from station to station. For some applications, the two identical housings 2 may be interconnected into a single unit without affecting the performance of the registry. The mechanism enclosed within either housing 2 is identical with the mechanism enclosed in the other housing 2; each is operated by a push rod, operated by a bellcrank system within the machine frame to be described in connection with FIG. 7. Two advantages accrue from the use of two separate housings 2 which together comprise a complete registry. The two housings 2 may be mounted on the machine bed with increased separation to accommodate larger pallets; and either housing 2 may be removed for maintenance or replacement without disturbing the transfer system. Furthermore, the use of a vertical push rod for actuation further facilitates such ease of interchange.

Referring to FIG. 3, parallel transfer rails 6 are mounted to the top of the housings 2. It is on these fixed transfer rails 6 that the pallets slide from one registry to the next by actuation of a transfer bar. Four foot members 8, mounted on the underside of a pallet 10 (FIG. 6), contact and are supported by the transfer rails 6. Holes 12 in two of the pallet foot members 8 can be engaged by vertically moving locator pins 14 to establish pallet location; and four vertically moving clamp members 16 can exert downward force on the upper faces of the pallet feet 8, to clamp them to the transfer rails 6.

Figure 4:
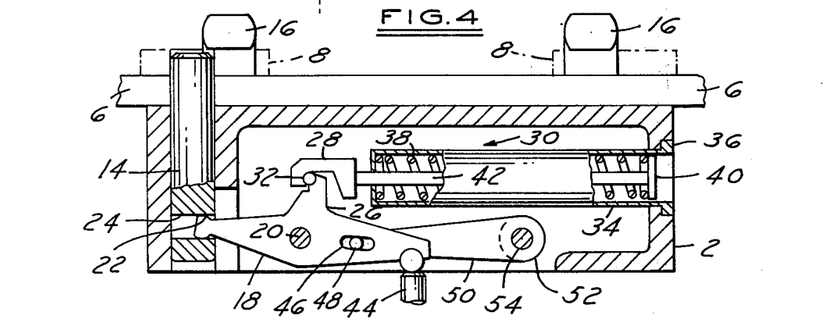
FIG. 4, a vertical section taken on line 4—4 of FIG. 3.
Figure 5:
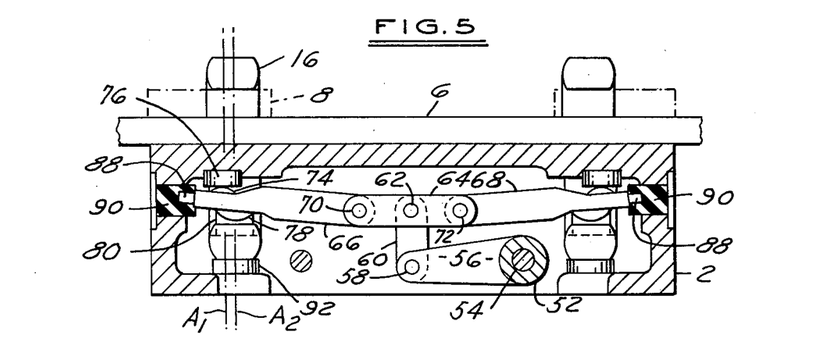
FIG. 5, a vertical section taken on line 5—5 of FIG. 3.
Figure 6:
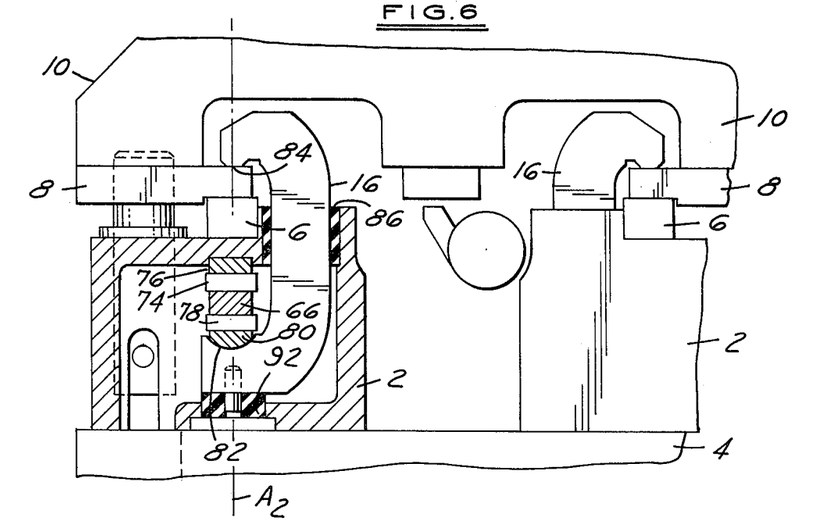
FIG. 6, a vertical section taken on line 6—6 of FIG. 3.
Figure 8:
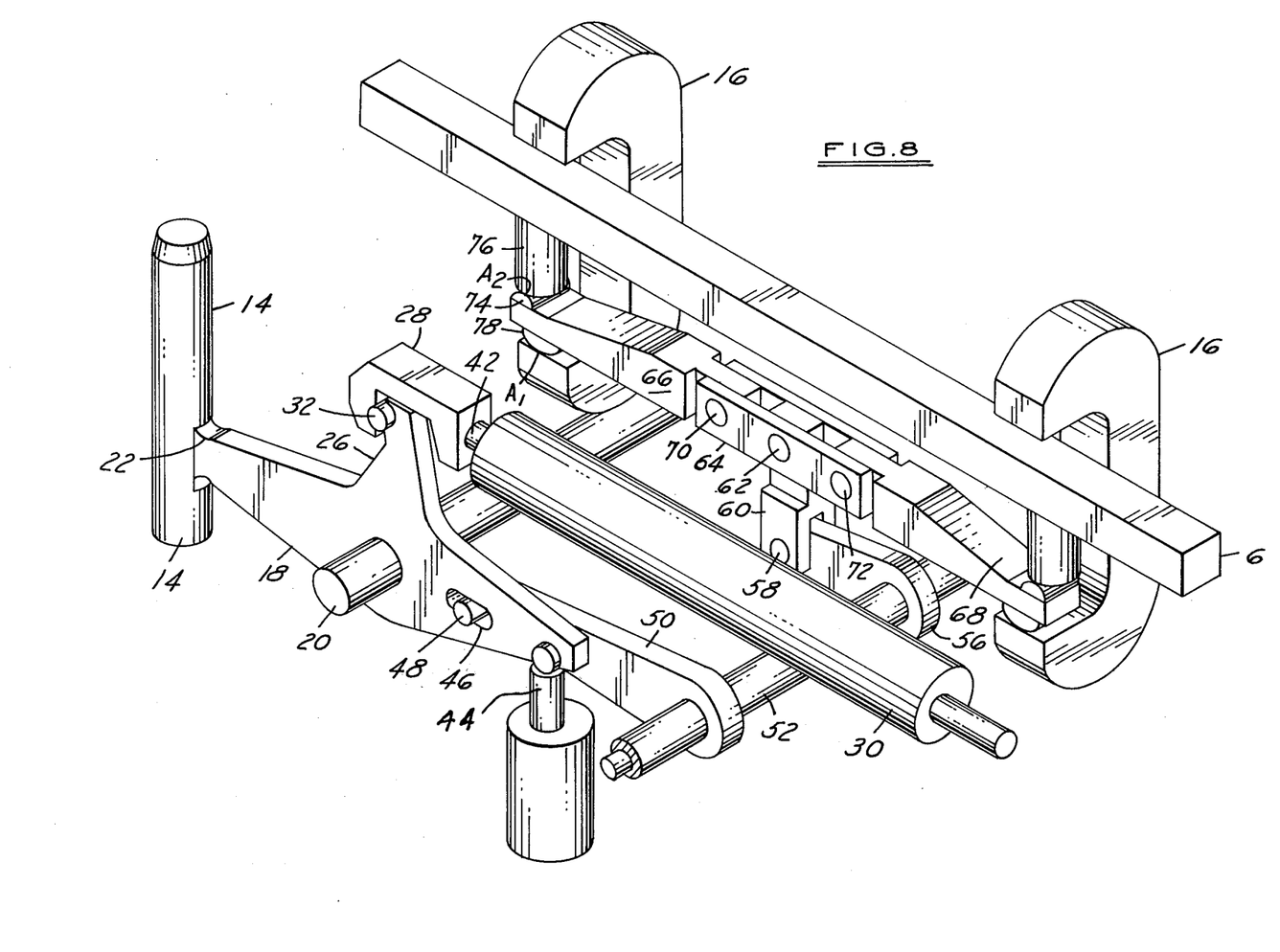
FIG. 8, a partially schematic exploded isometric view of a registry mechanism.

The details of the operating mechanism for the locator pins 14 and clamp members 16 are shown in the longitudinal sections in FIGS. 4 and 5, and the transverse section FIG. 6, while the entire mechanism is shown in expanded isometric view in FIG. 8.

Referring to FIG. 4, a master lever 18 is pivoted on a shaft 20 mounted in the housing 2. This master lever directly actuates the locator pin 14 through a spherical sector 22 which engages a cylindrical hole 24 in the locator pin 14. An offset portion 26 of the master lever 18 is engaged by the nosepiece 28 of an elastic energy cartridge 30 through a wear pin 32.

The elastic energy cartridge 30 is comprised of a sleeve 34 which is flanged at one end 36 to bear against the housing 2. Mounted within the sleeve 34 is a compression spring 38, which bears on one end against the partially closed end of sleeve 34 and at its other end bears against a head 40 formed on the end of a pull rod 42; the other end of pull rod 42 is threaded in and locked to nosepiece 28. The compression spring 38 is preloaded to a large degree during assembly prior to attachment of the nosepiece 28; or prior to attachment of the head 40 to the pull rod 42. It will be noted that even though the spring 38 operates in compression, the action of the entire cartridge is in tension, acting between the flange 36 and the nosepiece 28. This exerts a clockwise turning moment on the master lever 18 about pin 20. It will also be noted that the movement of pull rod 42 to the right is limited to the distance determined by nosepiece 28 which will contact the closed end of sleeve 34, at which position there is still considerable preload on spring 38. The preload is accomplished by an external assembly fixture of standard design which may be as simple as an arbor press to compress spring 38 during assembly. The practical advantage of using a preloaded spring cartridge is that it can be handled as a simple package during assembly of the registry, while still retaining the advantages of preload; this results in a more nearly flat force curve during the working stroke of the cartridge 30.

As noted above, the tensile force of the cartridge 30 exerts a clockwise moment on master lever 18 and extends the locating pin 14 upward into engagement with pallet foot member 8. This clockwise motion of master lever 18 also causes engagement of the clamp members 16 as will be described. The locating and clamping is accomplished entirely by the force and movement generated by the cartridge 30, to reach the position shown in FIG. 4.

The end of the master lever 18 opposite the spherical sector 22 is recessed to mate with a cylindrically ended push rod 44 which is externally actuated as will be described. A slot 46 is also formed into this side of the master lever 18. This slot 46 is engaged by a pin 48 mounted on an arm 50 which is attached to a torque tube 52 that rotates on a shaft 54 mounted in the housing 2.

Referring to FIGS. 5 and 8, the torque tube 52 also has mounted on it a clamp drive arm 56, which, at its outboard end is connected by pin 58 to clamp link 60. At its other end, the clamp link 60 is connected by pin 62 to an equalizing link 64, at or near its midpoint. Each end of equalizing link 64 is connected to clamp levers 66 and 68 by pins 70 and 72. Clamp levers 66 and 68 are symmetrically disposed about the longitudinal centerline and actuate two identical clamp mechanisms, only one of which need be described.

The clamp lever 66 has rigidly mounted to it a cylindrical convex member 74 which contacts a bearing pad 76 mounted in the housing 2. On the opposite side of clamp lever 66 is mounted a second cylindrical convex member 78 which makes area contact with a slipper member 80 whose upper surface is concave to mate with convex member 78. The lower side of slipper member 80 is convex at right angles to the upper concave surface. This lower convex surface of slipper member 80 mates with a concave surface 82 of clamp member 16. As can be seen in FIG. 6, the clamp member 16 is a "C" shaped member whose upper inboard surface 84 contacts and clamps the pallet foot member 8 to the slide rail 6; the clamp member 16 is mounted in the housing 2 through a resilient bushing 86 which permits adequate movement of clamp member 16.

FIG. 8 is a partially schematic isometric drawing and is intended only to indicate the functional relationship of the mechanism members. The housing 2 is completely deleted, and various members slightly altered for drawing simplicity and the slippers 80 are omitted completely to more clearly show the lever action of the clamp levers 66 and 68.

It will be noted (FIG. 5) that the contact line between the convex member 74 and reaction pad 76 is on axis $A_1$ and that the effective axis of the bearing between the convex member 78 and the slipper 80 is along the axis A₂, which is the clamp axis. In effect, the clamp lever 66 acts as a simple lever having a fulcrum with respect to the housing 2 on axis A₁, an output movement on axis A₂, and an input movement on the axis of pin 70. It can be seen that there is a considerable force magnification or leverage from the downward force of pin 70 to the downward force on the clamp member 16, which is transmitted as a clamp force on the pallet foot member 8 by surface 84. Yet this force magnification is achieved with a simple lever which is a "high efficiency" mechanism.

The clamp action of the clamp lever 68 is the same as that of the clamp lever 66 except that its operation is symmetrically opposite. Substantially equal downward forces for clamping are applied by pins 70 and 72 on the clamp levers 66 and 68 by the equalizing link 64 which is pulled downward by link 60 due to a counterclockwise torque on torque tube 52 and arm 56. This counterclockwise torque on torque tube 52 is generated by arm 50 (FIGS. 4 and 8), and pin 48 which is forced downward by slot 46 in master link 18 due to the clockwise torque exerted on this master link 18 by the spring cartridge 30.

It can be seen that the force generated by the spring cartridge 30 is transmitted to the pins 70 and 72 (FIGS. 5 and 8) by simple high efficiency levers such that the work (force times distance) delivered by spring cartridge 30 is decreased only slightly by friction when it appears at pins 70 and 72, and, due to the high efficiency of the clamp levers 66 and 68, when it appears as a clamp force at surface 84 on pallet foot member 8.

Stated another way, there is a large mechanical advantage in force transmittal from the spring cartridge 30 to the clamp surfaces 84, and this is only slightly less than the movement ratio of spring cartridge 30 to that of the clamp surfaces. It is well known that for a 100% efficient mechanism (and as can be derived by rearranging equation 1) that:

$$\frac{\text{Input Movement}}{\text{Output Movement}} = \frac{\text{Output Force}}{\text{Input Force}}$$

Therefore, for a system of simple levers and pivots, with a minimum work loss due to friction, this force ratio will be only slightly less than the movement ratio.

Referring again to FIG. 5, the outboard end of lever 66 (and symmetrically opposite lever 68) is formed into a cylindrical extension 88 which fits into a resilient bushing 90 supported by the housing 2. The two resilient bushings 90 are made of neoprene or the like, and it is their function to establish the left to right position (FIG. 5) of levers 66 and 68 and equalizing link 64, yet permit sufficient float to allow a true rolling contact between convex member 74 and action pad 76 when the clamp forces are being reacted by this fulcrum interface. To further permit a true rolling contact at this same interface, the holes in levers 66 and 68 and/or the corresponding holes in equalizing link 64 for pins 70 and 72 are slightly elongated or made oversize.

The underside of the clamp member 16 is supported by a resilient bushing 92, also made of neoprene or the like. This bushing 92 permits downward movement of the clamp member 16 during clamping, absorbs deflections in the clamp member 16 during its deflection under clamp loads, and provides the return force on the clamp member 16 during unclamping, as is to be described.

It will be noted from FIG. 5 that the fulcrum axis A₁ is only slightly displaced from the clamping axis A₂. This accomplishes two important things: it provides a large mechanical advantage in generating the clamp force as previously described; and it generates a very small reactive bending load in the housing 2. This small bending load in the housing 2 in turn minimizes the reactive deflections therein, which is significant when high accuracy is required.

It will be noted from FIG. 6 that the clamp force applied to the clamp member 16 by the clamp lever 74 through the convex member 78 and slipper 80 is directly in line with the clamp surface 84, on clamp axis A₂. This, of course, is what dictates the "C" shape of the clamp member 16. This clamp member 16 will deflect due to the clamp forces it is transmitting, but, because of its mounting into the housing 2 through the resilient bushings 86 and 92, deflection of the clamp member 16 causes negligible loads on the housing 2.

In essence then, this clamping system creates the theoretically most nearly perfect system to minimize deflection of the housing 2 due to the clamp forces. The largest load on the housing 2 due to the clamp forces is an almost pure compressive load which is experienced as a reactive load between the reaction pad 76 and the support rail 6.

Figure 7:
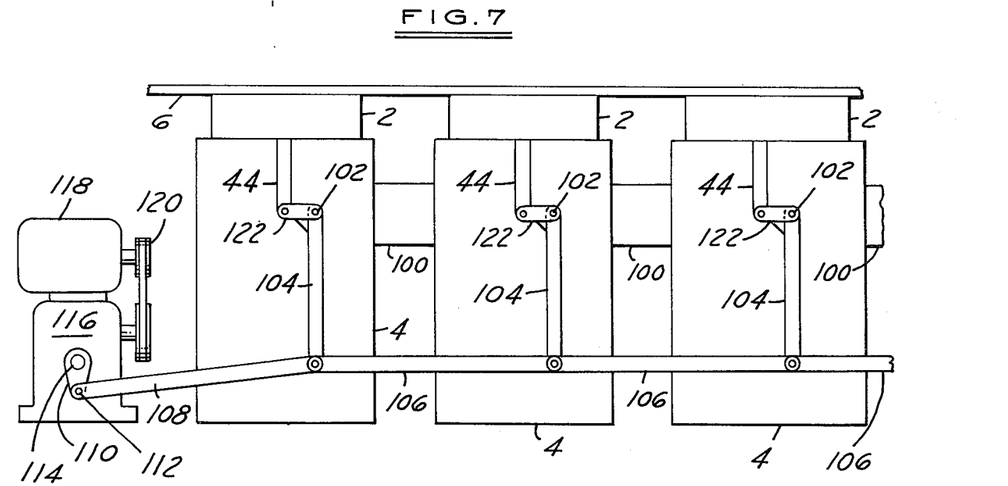
FIG. 7, a schematic elevation of the interconnecting mechanism for a group of registries.

It can be seen from the above mechanism description that the locating pins 14 are extended and the clamp members 16 exert their clamp force on the pallet foot members 8 due to the elastic work of the spring cartridge 30 which produces a clockwise movement and exerts a clockwise force for clamping on the master lever 18. The force and movement for unclamping and withdrawal of the locating pins 14 is provided by a common external system. As shown in FIG. 7, a series of machine beds 4 are connected together by spacers 100 to form the center section of a transfer machine. On each of these machine beds 4 are mounted two registry mechanisms 2, or a single registry if the two mechanisms are interconnected in a single housing. Only three machine beds 4 are shown; it will be understood that there are as many such machine beds as there are stations in the machine. It will also be understood that there may exist idle (non working) stations interposed between the working stations, which may or may not contain a registry for the pallet, or they may contain registries having only locating pins with the clamp portions of the registries omitted.

Within each machine bed 4, under the position of the registry, is journalled a shaft 102; on each such shaft 102 is mounted an actuator link 104. The other ends of links 104 are pivotally connected together by tie rods 106 equal in length to the corresponding distance between shafts 102. One of the links 104 is pivoting connected by a connecting rod 108 to a crank arm 110 through a crankpin 112; this crank arm 110 is mounted to the output shaft 114 of a gear reducer 116. An electric motor 118 in turn drives the gear reducer through belts and pulleys 120. It can be seen that as the motor 118 drives the gear reducer 116, the crank arm 110 causes the links 104 to oscillate about shafts 102 in substantially parallel motion. The crank arm 110 position shown in FIG. 7 has the links 104 at their approximate midstroke position. When the crank arm 110 is at the 9 o'clock position related to the center of the shaft 114, referred to as the top dead center position, all links 104 are in their most clockwise position relative to shafts 102. When the crank arm 110 is at the 3 o'clock position relative to the shaft 114, referred to as the bottom dead center position, all links 104 are in their most counterclockwise position relative to their shafts 102.

Each link 104 also has mounted on it two links 122 at approximately right angles to the link 104 to serve as a bell crank. At the outboard end of the links 122 is pivotally connected a push rod 44 which contacts the master lever 18 of a registry mechanism (FIG. 4).

All the registry mechanism master levers 18 are driven counterclockwise in unison as the crank arm 110 rotates from the 3 o'clock position to the 9 o'clock position, through the clockwise rotation of links 104 and 122 serving as a bell crank on shafts 102, the result being an upward movement of push rods 44.

Within each registry mechanism, the counterclockwise rotation of master lever 18 retracts the locating pin 14 (FIG. 4); extends the spring cartridge 30 by compressing spring 38, thereby storing work therein; and rotates the arm 50 on torque tube 52 clockwise through pin 48 in slot 46.

The clockwise rotation of torque tube 52 (FIG. 5) causes arm 56 to raise link 60 through pin 58 and this raises equalizer link 64 through pin 62. The clamp lever 66 rotates counterclockwise about its fulcrum pivot on axis $A_1$ and the resilient bushing 92 lifts the clamp member 16 to provide clearance between the surface 84 (FIG. 6) and the pallet foot 84. The withdrawal of all locating pins 14 and the lifting of the clamp members 16 is accomplished, therefore, by the rotation of the crank arm 110 from the 3 o'clock position to the 9 o'clock position; this also stores work in the spring cartridges 30. It will be noted that the direction of rotation of crank arm 110 is immaterial.

To accomplish the extension of the locater pins 14 and the engagement of the clamp members 16, the crank arm 110 rotates from its 9 o'clock position to its 3 o'clock position with the direction of rotation again immaterial. As a result, all push rods 44 move downward. This allows the spring cartridges 30 to rotate the master levers 18 clockwise.

During approximately the first two thirds of this motion, the locating pins 14 are extended while the clamp members move through the clearance space before contacting the pallet foot members 8. After the clamp members 16 contact the pallet foot members 8, some slight additional rotation of a master lever 18 takes place to compensate for the deflections of the clamp members 16 and the other members in the lever system as well as for the slight lost motions that occur at all the pin connections.

The exact point or position at which each registry mechanism develops full clamp force also depends on the various dimensional errors and wear on all mechanism members including the pallet foot members 8 and slide rails 6 which are subject to progressive and not necessarily uniform wear. But within a very wide range of such wear, each spring cartridge 30 and clamp mechanism will clamp a pallet with a substantially uniform amount of force. As each mechanism reaches its full clamp force and the mechanism reaches equilibrium, the spring cartridge 30 stops moving and the force generated is balanced out by the forces generated by the clamp surfaces 84, which, because of the high efficiency mechanisms employed, are far more reproducible than with wedges or screws.

The equilibrium full clamp position may vary from registry to registry because of the wear factors noted above. As each registry reaches its own equilibrium position, its master lever 18 stops rotating, but its associated push rod 44 will continue to move downward for its full stroke. A gap, variable from one registry to the next, and which may vary even in a given registry from pallet to pallet, will develop between the top of the push rod 44 and its recessed contact surface on master lever 18. This is of no consequence since it will be closed on the next unclamp upward movement of the push rod 44.

In essence, therefore, all clamps and locating pins are driven by the external power system to a common returned position, but the locating pins 14 are extended and clamps are actuated by an internal elastic power system, namely, the spring cartridges 30, whereby each registry mechanism can find its own equilibrium position independent of the other registries.

In an illustrative practical situation, the working stroke of the spring cartridge 30 will be $1\frac{1}{4}$ inches with a force output of 800 lbs. A total work output of 1000 lb. in. is therefore achieved. The total clamp member movement is 0.060 inches; since the work output is equally divided between two clamp members, the theoretical force generated at each clamp member is $1000/2/0.060 = 8333$ lbs. The practical force which is reached is 7500 lbs. at each clamp member. The total theoretical stroke of each clamp member, which is 0.060", is divided as follows: 0.035" clearance to theoretical pallet foot upper surface when clamp members are fully raised; 0.010" deflection of clamp member, and internal linkage members, and aggregate lost motions; and 0.015" unused stroke or "to go" which is available to compensate for pallet foot and slide rail wear. Stated another way, 0.015" total wear can be tolerated on the pallet feet or slide rails while still maintaining substantially constant clamping by the registry mechanism. This is severalfold greater than can be tolerated by present registries.

In FIG. 7, the connecting rod 108 is shown connected to the link 104 which is at the end of line of multiple links 104; it will be understood that by placing the gear reducer 116 off to one side or the other of the line of interconnecting links 106, the connecting rod 108 can be connected to any one of the intermediate links 104. It will be further understood that the entire motor gear reducer crank drive system can be replaced by any other type of suitable prime mover capable of moving the links 104 through their required angular range. This includes a simple fluid actuator attached to one or the other of links 104, or links 106. It will be noted that the links 104 are significantly longer than the links 122, approximately 5 times longer as shown in FIG. 7. The reason for this length ratio is to reduce the forces in links 106, as compared to the forces in the push rods 44; this is, of course, compensated for with a longer stroke in links 106 as compared to the stroke of push rods 44, in exact proportion to the force reduction. A force reduction in links 106 is advantageous because it reduces the amount of reactive force which must be supplied by the spacers 100; which reactive forces are cummulative along the length of the machine. A large stroke of the interconnecting links is also desirable, because the deflections, lost motions and cummulative wear are more tolerable with a large stroke than with a small one.

Figure 9:
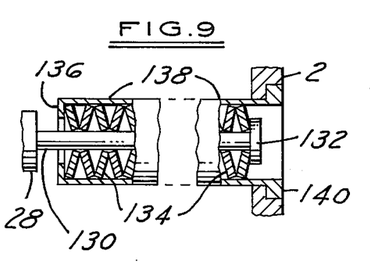
FIG. 9, a section through an alternate spring cartridge mechanism.

The spring cartridge shown in FIG. 4 utilizes a coiled wire spring operating in compression. Another type of spring cartridge is shown in FIG. 9; in this design, the elastic element is comprised of a stack of disc springs, also referred to as Belleville washers. Referring to FIG.

9, a pull rod 130 is connected to the nosepiece 28 (as in FIG. 4); the other end of pull rod 130 is formed into a head 132. A stack of disc springs 134 are concentrically positioned and preloaded on the pull rod 130 between the head 132 and an internal flange 36 on a sleeve 138; the other end of sleeve 138 has an external flange 140 mounted in the housing 2. Each disc spring 134 is a conical shaped washer, which in compression becomes more nearly planar. A stack of disc springs 134, as in FIG. 9, is generally to be preferred over a more conventional wire coil spring because a larger amount of work or energy can be stored in a given volume.

Figure 10:
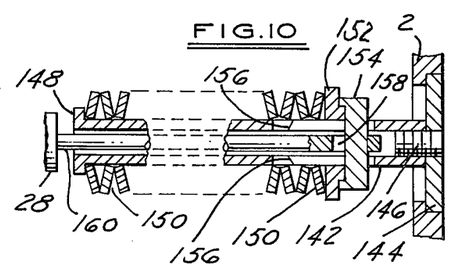
FIG. 10, a section through a second alternate spring cartridge mechanism.

An alternate design for the spring cartridge, while still using disc springs, is shown in FIG. 10. Here, the stationary sleeve 142 is screwed to a mounting disc plate 144 through a stud 146; the disc 144 is mounted to the housing 2. The other end of the sleeve 142 is formed into an external flange 148. A series of disc springs 150 are stacked on the outside of the sleeve 142 and bear against the flange 148.

At the other end of sleeve 142, this stack of disc springs 150 is preloaded against a shouldered washer 152. The washer 152 is held in place by a thin flat keeper 154 which extends across a diameter of the washer 152 passing through two long longitudinal slots 156 in the sleeve 142 and also passing through a slot 158 in a pull rod 160. At its other end, the pull rod 160 mounts the nosepiece 28. It can be seen that the tensile load in pull rod 160 is transmitted by the keeper 154, acting as a beam, into a compressive load on the stack of disc springs 150. As the pull rod 160 moves through its stroke, as determined by the mechanism, the keeper 154 remains loaded against the right side of slot 158 in pull rod 160, but the keeper 154 moves freely through the clearance slots 156 in sleeve 142.

Referring to FIGS. 5 and 6, it will be recalled that the resilient bushing 92 is utilized to return the clamping member 16 to its unclamped and clearance position upon release of the clamp force generated by lever 66. It will be understood that alternate elastic return systems can be used to accomplish this same return force. A short stack of disc springs can be utilized in place of bushing 92. A simple conventional wire coil spring can also be used to return the clamp member 16.

In connection with FIG. 7, one embodiment of an external mechanism, suitable for actuating the push rods 44 vertically upward, was described. Another means for accomplishing these same motions is to mount a long torque tube longitudinally through the machine beds, suitably journalled therein, which oscillates through a small angle on a horizontal axis. At each station an arm is fastened to the torque tube and the outboard end of each arm drives a vertically moving push rod 44 through a pivot connection. The torque tube in turn is driven by a suitable arm, connecting rod, and eccentric or the like. It can be seen that two torque tube assemblies are required, one to operate the push rods on one side of the registry line and a second to drive the push rod on the other side of the registry line.

Still another approach to operating the registries with a single external mechanism requires no push rods. A downwardly extending arm can be added to each master lever 18. The lower outboard ends of these extensions can then be connected together by links driven by a mechanism as in FIG. 7, to operate all the master lever extensions and registries in synchronism.

I claim:

1. In a multiple station transfer machine in which workpieces are located and supported in pallets, and in which said pallets are moved in sequence through said machine, interrelated registry mechanisms for locating and clamping said pallets, each of which comprises:
    (a) a registry frame,
    (b) one or more locating pin means slideably mounted in said frame to engage corresponding locating holes in said pallet,
    (c) clamping means for said pallet movably mounted in said frame to contact said pallet on a contact surface,
    (d) elastic energy storage means individual to and mounted in said registry frame,
    (e) mechanical means on said frame interconnecting said energy storage means with said locating pin means and with said clamping means to sequentially engage said locating pins in said holes in said pallet and clamp said pallet to said registry frame independently of outside forces, and
    (f) external power means interconnected with said mechanical means operable only to retract said clamping means from said pallet and thereafter to disengage said locating pin means from said holes in said pallet after engagement by said energy storage means.

2. A registry mechanism as in claim 1 in which said mechanical means comprises only interconnected high-efficiency fulcrummed levers.

3. A registry mechanism as in claim 1 in which said mechanical means consists of an assembly of pivoted levers and interconnecting links, each characterized as a high efficiency mechanism.

4. A registry mechanism as in claim 1 in which said mechanical means comprises:
    (a) a first pivotally mounted in said frame and having four interconnection means which include:
        (1) a first connection to a locating pin,
        (2) a second connection to said energy storage means,
        (3) a third connection to said external power means, and
        (4) a fourth connection to a hereinafter referenced intermediate lever,
    (b) an intermediate lever pivotally mounted in said frame and in turn pivotally connected to one end of a hereinafter referenced link means,
    (c) a link means which, at its other end, is pivotally connected to the approximate midpoint of a hereinafter referenced equalizing lever,
    (d) an equalizing lever which, at each of its ends, is pivotally connected to one of hereinafter referenced clamp levers,
    (e) two symmetrically disposed clamp levers, each of which is pivotally connected to said frame at one end, pivotally connected to said equalizing lever at its other end, and connected at an intermediate point to said clamping means.

5. A registry mechanism as in claim 1 in which said clamping means has a portion to apply a clamp force to said pallet along a first axis substantially perpendicular to the contact surface between said clamping means and said pallet, and a reaction portion positioned so that said clamp force is reacted by said registry frame along a second axis substantially parallel to and closely disposed to said first axis, thereby minimizing the reactive bending moment applied to said registry frame by said clamping means.

6. A registry mechanism as in claim 1 in which said energy storage means is comprised of a first elongate member, a second elongate member slideably mounted in said first elongate member, an elastic spring means mounted between said elongate members, and means limiting the relative travel between said elongate members, whereby said elastic spring means cannot achieve a fully relaxed position, and whereby the working stroke of said energy storage means is between a partially deflected position of said elastic spring means and an even greater deflected position of said elastic spring means.

7. A registry mechanism as in claim 1 in which said external power means comprises:
   (a) shaft mounted in the machine bed spaced from said registry mechanism,
   (b) a bellcrank journalled on said shaft having a short section with an outboard end spaced from said shaft and a long section,
   (c) a push rod interconnecting said outboard end of said short section of said bellcrank and said mechanical means of said registry mechanism, and
   (d) means interconnecting and driving said multiple long sections of said bellcrank under said registry mechanisms.

8. A multiplicity of registry mechanisms as in claim 7 in which said interconnecting and driving means comprises:
   (a) drive means connected to one of said long sections of said bellcranks to oscillate said bellcrank about said shaft, and
   (b) a multiplicity of links interconnecting one or more long sections of said bellcranks, whereby all said long sections of said bellcranks oscillate in unison.

9. In a multiple station transfer machine in which workpieces are supported and located in pallets, and in which said pallets are moved in sequence through said machine, registry mechanisms for locating and clamping said pallets, each of which comprises:
   (a) a registry frame,
   (b) locating means on each said registry frame to locate said pallet thereon,
   (c) clamping means on each said registry frame to clamp said pallet thereon, and
   (d) actuating means on each said registry frame to actuate in sequence said locating means and said clamping means comprising one or more interconnected high efficiency mechanism,
   (e) an elastic stored energy mechanism individual to each registry means to actuate said locating and clamping means, and
   (f) a mechanical means selectively operable only to overcome the action of said stored energy means and to retract said locating and clamping means.

10. A registry mechanism as in claim 9 in which said actuating means to actuate said locating means and said clamping means comprises one or more interconnected high efficiency mechanisms whereby the total work output, force times distance moved, of the clamp means is at least 70% or more of the work input, force times distance.

11. A registry mechanism as in claim 9 in which said actuating mechanism comprises:
   (a) a first lever pivoted in said frame and having a first portion operatively associated with said locating means,
   (b) a second lever having a fulcrum connection to said frame and operatively associated with said clamp means, and
   (c) means interconnecting said first and second levers.

12. A registry mechanism as in claim 11 in which said interconnecting means comprises:
   (a) a third lever pivoted in said frame and operatively associated with said first lever, and
   (b) link means connecting said second and third levers.

13. In automation equipment using multiple station transfer machines for moving pallets from station to station for the purpose of having work done thereon, a registry system including a locator pin and a clamp for locating and clamping each pallet at a station which comprises:
   (a) a first lever to actuate a locator pin,
   (b) a second lever to actuate a clamp,
   (c) means operatively associating said levers wherein a sequential location and clamping action will progress,
   (d) elastic means at each station to bias said levers respectively in a locating and clamping position, said elastic means being the only motativating force to effect said clamping and locating, and
   (e) means to actuate one of said levers at each station to overcome the bias of said elastic means acting on said first and second levers to effect the release of the pallets at each station from its respective locator pin and clamp.

14. A system as defined in claim 13 which includes a resiliently mounted C-clamp having one arm to contact a positioned pallet at a predetermined first point on a contact axis, and a second arm to contact an arm of said second lever at a predetermined point on said same contact axis spaced from said first point.

15. A system as defined in claim 13 in which said locator pins and said clamps are positioned in spaced relation laterally of the lineal path in said transfer machine, and said clamp lever and said first lever are similarly spaced from each other laterally of said lineal path of said transfer machine, and means operatively associating said levers comprising a torque bar extending between said levers, and lever arms extending from said torque bar in the same direction, each connected respectively to a clamp lever and a first lever.

16. In a multiple station transfer machine in which workpieces are supported and located on pallets, and in which said pallets are moved in sequence through said machine, registry mechanisms for locating and clamping said pallets, each of which comprises:
   (a) a registry frame,
   (b) locating means on said registry frame to locate said pallet thereon,
   (c) clamping means for said pallet comprising one or more clamp members each of which has a portion to apply a clamp force to said pallet along a first axis substantially perpendicular to the contact surface between said clamp member and said pallet, and a reaction portion positioned so that said clamp force is reacted by said registry frame along a second axis substantially parallel to and closely disposed to said first axis, thereby minimizing the reactive bending moment applied to said registry frame by said clamping member,
   (d) actuating frame on each registry frame to actuate in sequence said locating means and said clamping means, (e) an elastic stored energy mechanism individual to each registry means to actuate said locating and clamping means, and (f) a mechanical means selectively operable only to overcome the action of said stored energy means and to retract said locating and clamping means.

17. In a multiple station transfer machine in which workpieces are located and supported in pallets, and in which said pallets are moved in sequence through said machine, mechanism for clamping said pallets, comprising:

(a) a registry frame, (b) a clamp for said pallet movably mounted in said frame having a first portion to engage a pallet in a clamping relationship with one face of a rigid section of said frame, and having a second portion to receive a clamping force to move said first portion into a clamping position, said second portion being opposed to and located on the opposite side of said frame section from said first portion, (c) a clamp actuator means to cause engagement of said clamp with said pallet which comprises:
 (1) a clamp lever pivotally connected to said frame movable from a non-clamping position to a clamping position,
 (2) a first fulcrum portion on said clamp lever to contact said second portion of said clamp along a first axis, the pivotal connection between said frame and lever comprising a reaction fulcrum portion on said lever positioned to contact said frame on a face of said frame section opposite said one face along a second axis substantially parallel to and closely disposed to said first axis, to place said frame section in compression between said pallet and said reaction fulcrum portion, thereby minimizing the reactive bending moment applied to said registry frame by said clamp, (d) mechanical means for actuating said clamp and actuator means to move said clamp lever from a non-clamping position to a clamping position, and (e) means operatively connected with said clamp for returning said clamp from the clamping position to the non-clamping position when said clamp lever is moved from a clamping position to a non-clamping position.

18. A multiple station transfer machine as defined in claim 17 in which said clamp comprises a "C" shaped member having a substantially straight body, an upper extension extending transversely to said body, and a lower extension also extending transversely to said body and substantially coplanar with said upper extension, said first portion of said clamp comprising a surface on said upper extension facing said lower extension and adapted to apply a a clamping force to said pallet, said second portion comprising a surface on said lower extension facing said upper extension and adapted to be actuated by said mechanical means, with said two surfaces lying on an axis substantially parallel to said body of said clamping means.

19. A multiple station transfer machine as defined in claim 18 in which the body of said "C" shaped member is mounted in said registry frame by non-rigid means, whereby deflections in said body impose negligible loads on said registry frame.

20. A multiple station transfer machine as defined in claim 19 in which said non-rigid means comprises a resilient bushing.

21. A multiple station transfer machine as defined in claim 17 in which said first and second closely disposed axes each pass through the projected and opposed portions of said clamp.

22. A multiple station transfer machine as defined in claim 17 in which one or more locating pins are slideably mounted in said frame to engage corresponding locating holes in said pallet, said locating pins being movable by said mechanical means from a locating position to a position free of said pallet, said mechanical means comprising:

(a) a first lever pivot mounted in said frame and having four interconnection means which include:
 (1) a first connection to a locating pin,
 (2) a second connection to an energy storage means,
 (3) a third connection to said external power means, and
 (4) a fourth connection to a hereinafter referenced intermediate lever, (b) an intermediate lever pivotally mounted in said frame and in turn pivotally connected to one end of a hereinafter referenced link means, (c) a link means which, at its other end, is pivotally connected to a hereinafter referenced actuating lever, (d) an actuating lever which at one end is pivotally connected to one end of said clamp lever.

23. A multiple station transfer machine as defined in claim 22 in which two symmetrically disposed clamp levers are disposed in said frame extending in opposite directions, and said actuating lever comprising an equalizing lever pivoted at each end to an end of said respective clamp levers, said link being pivotally connected to the approximate midpoint of said equalizing lever.

24. A multiple station transfer machine as defined in claim 22, in which said energy storage means is comprised of a first elongate member, a second elongate member slideably mounted in said first elongate member, an elastic spring means mounted between said elongate members, and means limiting the relative travel between said elongate members, whereby said elastic spring means cannot achieve a fully relaxed position, and whereby the working stroke of said energy storage means is between a partially deflected position of said elastic spring means and an even greater deflected position of said elastic spring means.

25. A multiple station transfer machine as defined in claim 22 in which an external power source is provided to actuate said mechanical means comprising:

(a) a shaft mounted in the machine bed spaced from said registry mechanism, (b) a bellcrank journalled on said shaft having a short section with an outboard end spaced from said shaft and a long section, (c) a push rod interconnecting said outboard end of said short section of said bellcrank and said mechanical means of said registry mechanism, and (d) means interconnecting and driving said multiple long sections of said bellcrank under said registry mechanisms.

26. A multiple station transfer machine as defined in claim 25 in which said interconnecting and driving means comprises:

(a) drive means connected to one of said long sections of said bellcranks to oscillate said bellcrank about said shaft, and (b) a multiplicity of links interconnecting one or more long sections of said bellcranks, whereby all said long sections of said bellcranks oscillate in unison.

27. A multiple station transfer machine as defined in claim 22 in which said locator pins and said clamps are positioned in spaced relation laterally of the lineal path in said transfer machine, and said clamp lever and said first lever are similarly spaced from each other laterally of said lineal path of said transfer machine, and means operatively associating said levers comprising a torque bar extending between said levers, and lever arms extending from said torque bar in the same direction, each connected respectively to a clamp lever and a first lever.

28. In automation equipment using multiple station transfer machines for moving pallets from station to station for the purpose of having work done thereon, a registry system including a locator pin and a clamp for locating and clamping each pallet at a station which comprises:

(a) a first lever to actuate a locator pin,
(b) a second lever to actuate a clamp,
(c) means operatively associating said levers wherein a sequential location and clamping action will progress,
(d) means to bias said levers in a locating and clamping position,
(e) means to actuate one of said levers against said bias to release a pallet from a locator pin and a clamp,
(f) a resiliently mounted C-clamp having one arm to contact a positioned pallet at a predetermined first point on a contact axis,
(g) a second arm to contact an arm of said second lever at a predetermined point on said same contact axis spaced from said first point, and
(h) said second lever being fulcrummed at a point directly above said second arm and adjacent but offset from said contact axis.

* * * * *

UNITED STATES PATENT AND TRADEMARK OFFICE
CERTIFICATE OF CORRECTION

PATENT NO. : 4,362,233
DATED : December 7, 1982
INVENTOR(S) : John H. Brems

It is certified that error appears in the above-identified patent and that said Letters Patent are hereby corrected as shown below:

Col. 1, Line 5, change "Pellet" to -- Pallet --.

Col. 1, Line 10, change "Pellet" to -- Pallet --.

Col. 12, Line 36, after "first" insert -- lever --.

Signed and Sealed this

First Day of March 1983

[SEAL]

Attest:

GERALD J. MOSSINGHOFF

Attesting Officer   Commissioner of Patents and Trademarks